(12) United States Patent
Frank et al.

(10) Patent No.: US 6,494,366 B2
(45) Date of Patent: Dec. 17, 2002

(54) REMOVABLE MERCHANT CARD DRAWER AND METHOD FOR USING SAME

(75) Inventors: Christopher Lynd Frank, Rough and Ready, CA (US); Allegra D. Hakim, Rocklin, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 3 days.

(21) Appl. No.: 09/774,051

(22) Filed: Jan. 31, 2001

(65) Prior Publication Data

US 2002/0148891 A1 Oct. 17, 2002

(51) Int. Cl.[7] ................................................. G06K 5/00
(52) U.S. Cl. ........................ 235/380; 235/441; 235/479
(58) Field of Search .................................. 235/380, 379, 235/441, 444, 448, 446, 492, 479, 475, 480

(56) References Cited

U.S. PATENT DOCUMENTS

| | | | | |
|---|---|---|---|---|
| 5,036,184 A | * | 7/1991 | Sasaki | 235/479 |
| 5,049,728 A | * | 9/1991 | Rovin | 235/492 |
| 5,563,400 A | * | 10/1996 | Le Roux | 235/486 |
| 5,667,397 A | * | 9/1997 | Broschard, III et al. | 439/188 |
| 5,929,427 A | * | 7/1999 | Harada et al. | 235/492 |
| 6,006,987 A | * | 12/1999 | Hoolhorst | 235/375 |
| 6,016,954 A | * | 1/2000 | Abe et al. | 235/379 |

* cited by examiner

Primary Examiner—Michael G. Lee
Assistant Examiner—Daniel St. Cyr (57) ABSTRACT

A drawer assembly, a financial transaction terminal and a method for manipulating the drawer assembly with respect to a financial transaction terminal. The financial transaction terminal uses a merchant card to record information pertaining to transactions between two parties, e.g., a customer and a merchant. The merchant card is held within the drawer assembly such that the merchant card is automatically inserted into the terminal when the drawer assembly is inserted into the terminal. Additionally, the merchant card is automatically removed from the terminal when the drawer assembly is removed from the terminal. The drawer assembly is removably connected to the terminal via a movable tab member. Depression of the tab member both releases the drawer assembly and applies pressure on the merchant card to thereby facilitate removal of the merchant card from the terminal. The drawer assembly and the merchant card can thus be inserted into and removed from a bottom side of the financial transaction terminal without requiring that the terminal be flipped over.

20 Claims, 9 Drawing Sheets

REMOVABLE MERCHANT CARD DRAWER AND METHOD FOR USING SAME

FIELD OF THE INVENTION

This invention relates generally to a point of sale financial transaction terminal and more particularly to a drawer for facilitating insertion and removal of a merchant card (smart card) and a method for manipulating the drawer and merchant card with respect to the terminal.

BACKGROUND OF THE INVENTION

A merchant card, i.e., smart card, is typically a credit-card sized plastic card with an embedded computer chip and a physical connector on the surface of the card. The chip may either be a microprocessor with an internal memory or a memory chip with a non-programmble logic. The use of smart cards (hereinafter "merchant cards") has gained widespread acceptance as evidenced by the number of existing applications as well as those currently being developed, especially in the financial industry. One such application for the merchant card is a recordation of financial transactions between two parties (e.g., customer and merchant).

Point-of-sale ("POS") financial transaction terminals are one type of device in which the above-described application may be transacted. In these types of terminals, a merchant card is typically housed within the terminal and collects information pertinent to financial transactions between a merchant and various customers. In this respect, POS financial transaction terminals possessing a merchant card are used, for example, to record the amount of the purchase made with a customer card (e.g., debit or charge card) and credited directly to the merchant card. In other words, the transaction amount is debited from the customer card and credited to the merchant card. Thus, the merchant card may be a useful tool to for a merchant to collect payment from his or her customers. As such, the merchant card may also be potentially valuable and thus a target for would-be criminals.

It is thus advantageous for the merchant to remove the merchant card for safe storage and/or deposit into a financial institution after the merchant card has recorded a sufficient number of transactions or at the end of a business day. In this regard, the merchant card may be removably placed within the financial transaction terminals. However, in an effort to deter would-be thieves, merchant cards are generally positioned in relatively hidden and inaccessible areas of the terminals. For example, merchant cards are typically positioned on a bottom side of the transaction terminals. As an added measure, merchant cards are typically housed within the terminal with a cover threadably fastened to the housing of the terminal.

Although these types of terminals may provide some level of protection against theft, they suffer from a variety of drawbacks and disadvantages. For instance, due to the positioning and fastening of the merchant cards, an increased possibility of merchant cards becoming damaged exists. That is, to remove the merchant cards, the entire terminal must be flipped over and a tool (e.g., screwdriver) is required to remove a cover member. Thereafter, the merchant card is manually removed from its connection to the terminal. This series of maneuvers can be quite cumbersome and the likelihood that the terminal and/or the merchant card will become damaged arises.

Known transaction terminals of this type also typically include a number of multi-Security Access Module ("SAM") connectors, as well as, the SAMs inserted within the connectors. Additionally, these terminals include a merchant card connector and a merchant card. In certain situations, all of the above-cited components of the terminals must be accessed by the merchant (e.g., when the SAMs or merchant card must be replaced). In order to allow access to these components by the merchant, known terminals of this type are typically rather large. These types of terminals are rather disadvantageous because they require a large amount of counter space, which merchants generally require for other devices (e.g., cash register, scanners, etc.).

Moreover, in known transaction terminals of this type, the merchant card is normally inserted directly into the merchant card connector of the transaction terminal. This type of connection is disadvantageous because it positions the merchant card to a greater possibility of damage. For instance, because the merchant card is directly inserted into the merchant card connector without any outside support, the physical connector of the merchant card is susceptible of suffering surface damage.

Accordingly, there is a need for a financial transaction terminal in which the position of the merchant card is relatively hidden from view and which can be inserted and removed from the terminal without requiring that the terminal be turned over. Additionally, a merchant card cover which can be removed without a tool is desirable.

In addition, there is a need for a relatively small financial transaction terminal having sufficient space to allow for rather easy access to the multi-SAMs and the merchant card as well as the their respective connectors.

Furthermore, it is advantageous to have a terminal which effectively protects the merchant card during insertion thereof into the terminal.

SUMMARY OF THE INVENTION

In accordance with one aspect, the present invention pertains to a drawer assembly for covering multi-secure access module connectors and a merchant card connector housed within a cavity of a financial transaction terminal. The drawer assembly includes a first member and a second member. The first member is connected to the second member to thereby form a space therebetween for receiving and holding a merchant card. The second member includes a movable tab member having an upper surface and a lower surface, the tab member extending from an end of the second member. The drawer assembly is capable of securedly holding and positioning a merchant card for insertion into and removal from the financial transaction terminal and the drawer assembly is capable of interconnecting with the terminal. When the merchant card is positioned in the drawer assembly, a downward movement of the movable tab causes the drawer assembly to become released from the terminal, such that removal of the drawer assembly causes the merchant card to disengage from the merchant card connector to thereby facilitate removal of the merchant card from the financial transaction terminal.

In accordance with another aspect, the present invention relates to a financial transaction terminal for transferring credit information from a customer card to a merchant card. The terminal includes a housing having an upper side and a bottom side, a cavity for allowing access to at least one multi-secure access module connector and a merchant card connector formed in the bottom side of the terminal. The cavity has a generally downwardly extending lip provided at a front part of the cavity. The terminal also includes a drawer assembly capable of being removably inserted over the cavity to substantially cover the cavity. A merchant card is securedly and removably held in a space formed in the drawer assembly, such that the merchant card is inserted into the merchant card connector when the drawer assembly is generally fully inserted into the cavity and the merchant card is removed from the merchant card connector when the drawer assembly is removed from the cavity.

According to another aspect, the invention relates to a method of manipulating a merchant card with respect to a financial transaction terminal. The financial transaction terminal having a merchant card connector positioned in a cavity located in a bottom portion of the terminal. In the method, a drawer assembly having a tab member is provided for substantially covering the cavity. A rear end of the merchant card is positioned into a space defined in the drawer assembly, such that the merchant card is substantially securely maintained within the drawer assembly. The drawer assembly and merchant are inserted into the cavity to thereby substantially cover the cavity, such that the merchant card is substantially simultaneously inserted into the merchant card connector.

BRIEF DESCRIPTION OF THE DRAWINGS

Features and advantages of the present invention will become apparent to those skilled in the art from the following description with reference to the drawings, in which.

DETAILED DESCRIPTION OF THE INVENTION

For simplicity and illustrative purposes, the principles of the present invention are described by referring mainly to an exemplary embodiment thereof, particularly with references to an example of a financial transaction terminal. However, one of ordinary skill in the art would readily recognize that the same principles are equally applicable to, and can be implemented in, any device that utilizes a removable information storing card, and that any such variation would be within such modifications that do not depart from the true spirit and scope of the present invention.

Financial Transaction Terminal and Drawer Assembly

Figure 1:
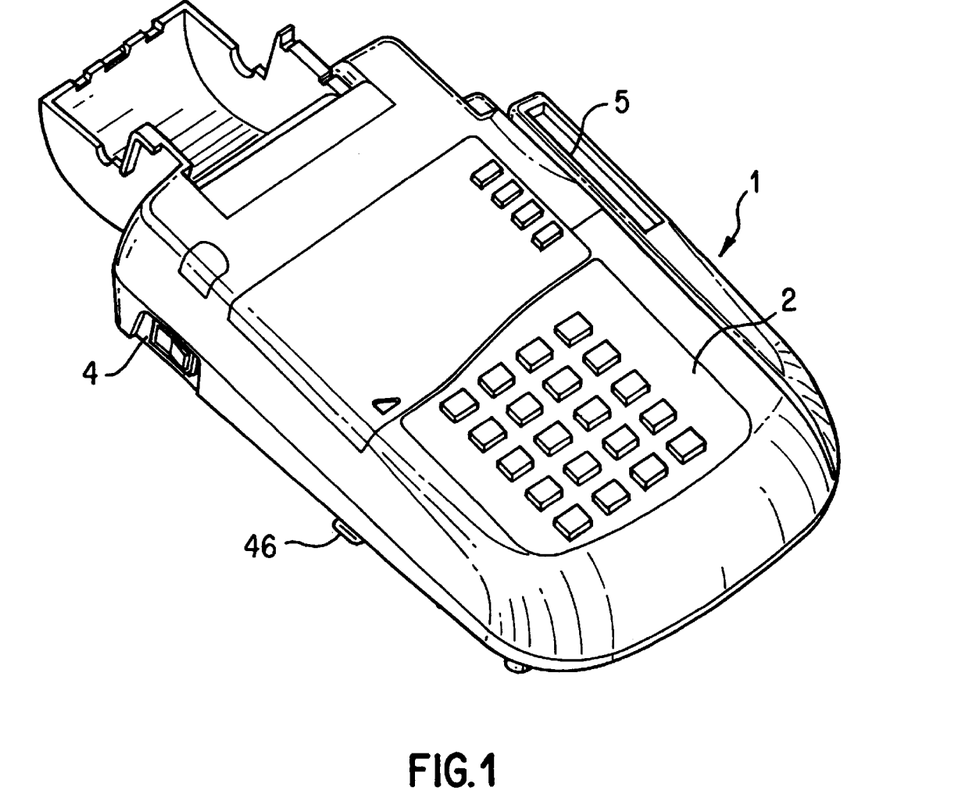
FIG. 1 is a perspective frontal view of a financial transaction terminal in accordance with the principles of the present invention.

As illustrated in FIG. 1, a financial transaction terminal 1 includes a keypad 2 for inputting information (e.g., the amount to be debited and credited) and a power switch 4. Also illustrated in FIG. 1 is a tab member 46 of the drawer assembly 10 (see FIG. 2). As can be seen from this figure, the tab member 46 is easily accessible without having to flip the terminal 1 over. Additionally, the tab member 46 is fairly indiscreet, thus making it difficult for an outside observer (e.g., a would-be thief) to determine its functionality.

Figure 2:
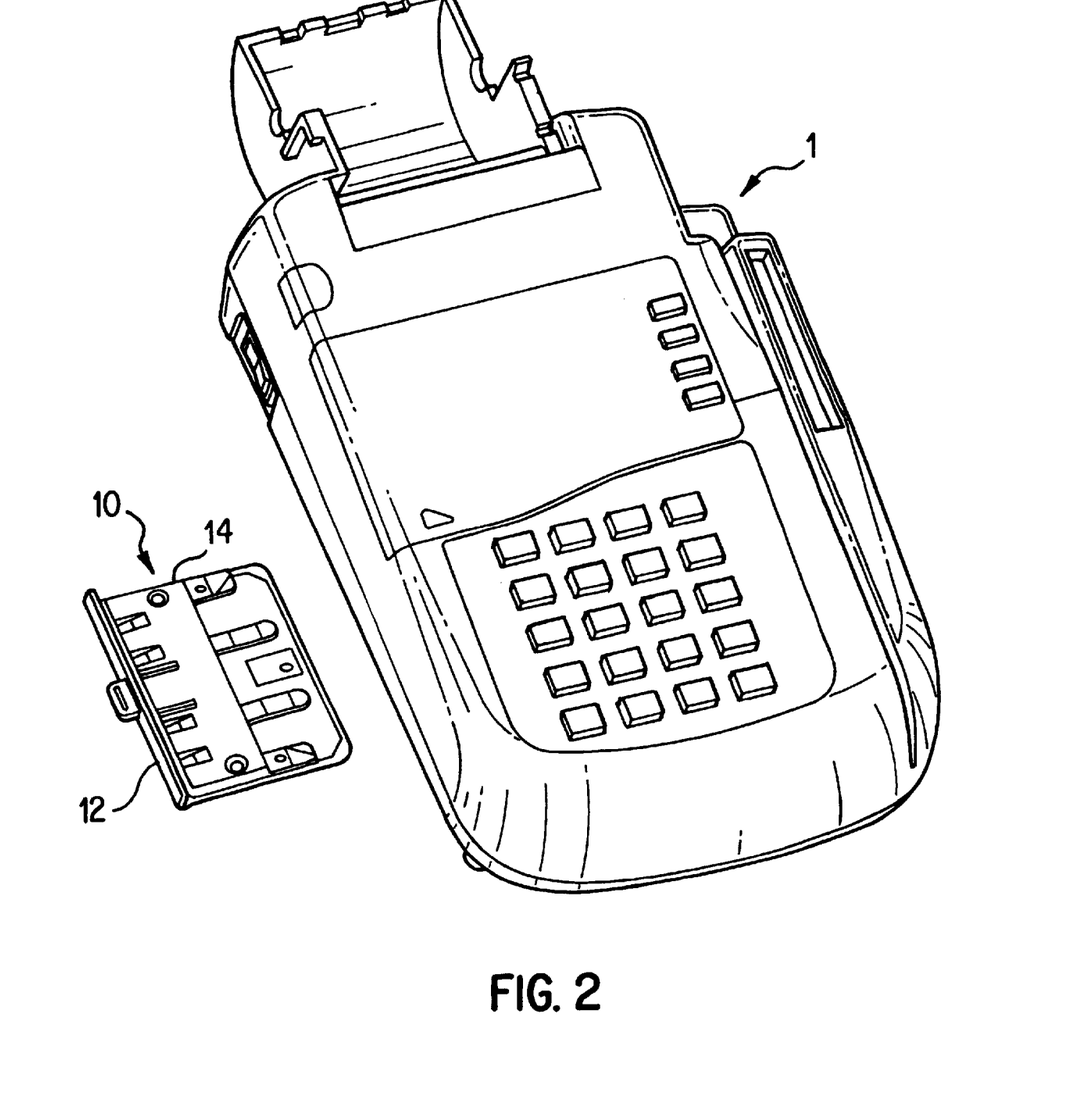
FIG. 2 is a view similar to FIG. 1 and shows a perspective view of the drawer assembly of an exemplary embodiment of the present invention removed from the financial transaction terminal.

FIG. 2 shows the drawer assembly 10 in its removed state from the terminal 1. As illustrated in FIG. 2, the drawer assembly 10 can be removed without flipping the terminal 1 over. As also seen in FIG. 2, the drawer assembly possesses a first member 12 and a second member 14, both of which are described in greater detail hereinbelow.

Figure 3:
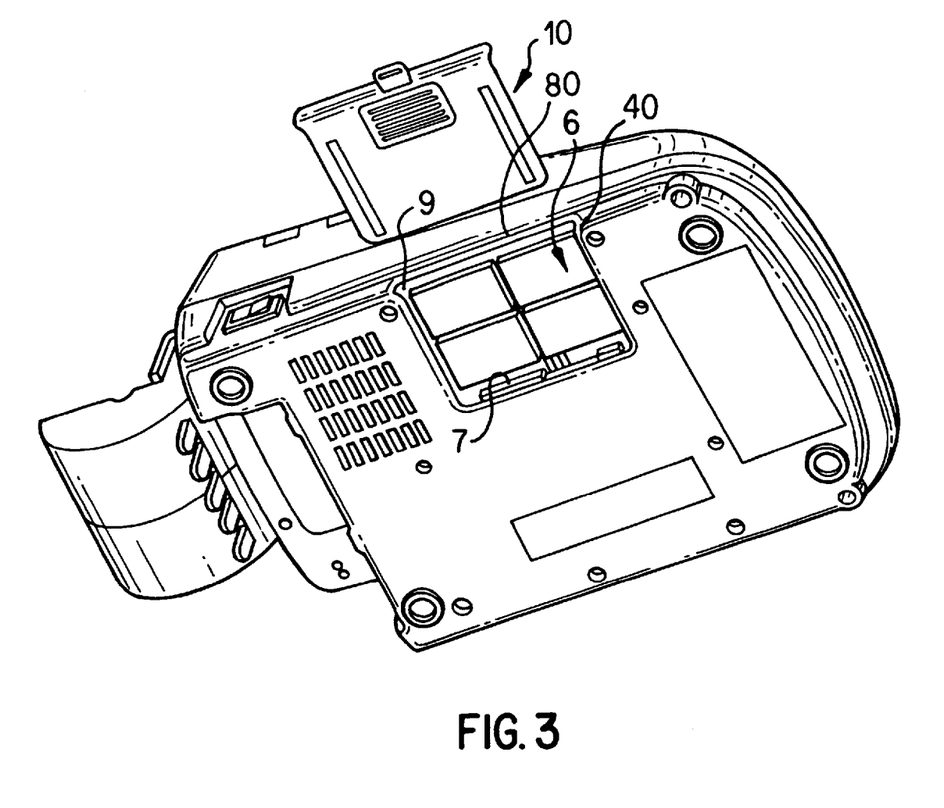
FIG. 3 is a perspective bottom view showing the drawer assembly and financial transaction terminal of an exemplary embodiment of the present invention.

FIG. 3 is similar to the view illustrated in FIG. 2, however, in FIG. 3, the terminal 1 and drawer assembly 10 are illustrated from the bottom sides thereof. As illustrated in FIG. 3, a cavity 9 is formed within the casing of the terminal 1. The cavity 9 houses at least one, and preferably four multi-secure access module ("SAM") connectors (not shown) and a full sized merchant card connector 7. Although the multi-SAM connectors are not shown, FIG. 3 illustrates four SAMs 6 connected to the multi-SAM connectors. It is to be appreciated, however, that the present invention is not limited to four SAMs 6, but rather, any reasonable number of SAMs may be utilized with the present invention. The cavity 9 is illustrated in FIG. 3 as possessing a pair of tongue-like projections 40 located on the side edges of outer rim of the cavity to facilitate insertion of the drawer assembly 10. Additionally, the cavity 9 has a downwardly extending lip 80 formed at the front of the cavity 9 to facilitate locking of the drawer assembly 10 to the terminal 1. The manner in which the tongue-like projections 40 as well as the downwardly extending lip 80 operate with respect to the drawer assembly 10 will be discussed in greater detail hereinbelow.

Figure 4:
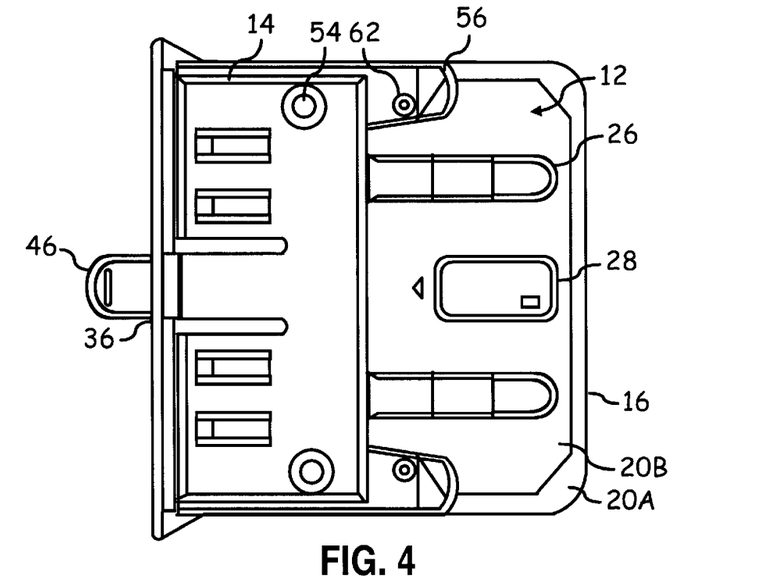
FIG. 4 is a top plan view of the drawer assembly in an assembled state.
Figure 5:
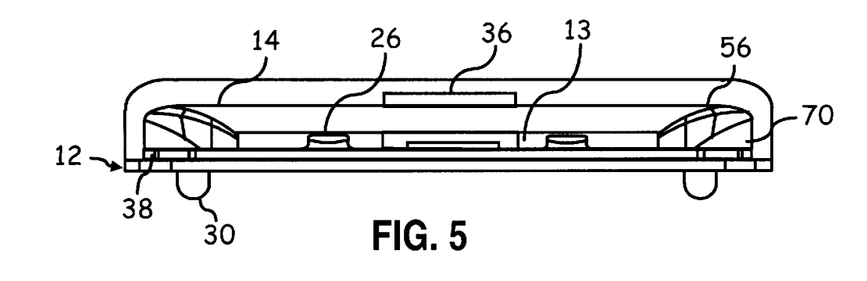
FIG. 5 is an elevational front view of the drawer assembly of FIG. 4.

As illustrated in FIG. 4, the drawer assembly 10 includes the first member 12 and the second member 14. Both the first member 12 and the second member 14 can be made entirely from any known suitable material, including, any known suitable plastic material, ABS, and the like. As seen in FIGS. 4 and 5, the second member 14 is positioned on top of the first member 12 and interconnected therewith. In this respect, the first member 12 and the second member 14 may be fastened together by any known means, for example, with adhesive, ultrasonic welding, and the like.

As further seen in FIG. 5, a space 13 is provided between the first and second members 12, 14 in respective relative centers thereof, such that a merchant card can be inserted therein. In this respect, according to a preferred embodiment of the present invention, the gap is made to be only slightly larger than a merchant card 8 (shown in FIG. 18). That is, the merchant card 8 may be housed somewhat tightly within the space 13. As still further seen in FIG. 5, a female connector section 38 is formed on two sides thereof. In use, the female connector sections 38 receive the tongue-like projections 40 of the cavity 9 (shown in FIG. 3) to guide and securely hold the drawer assembly 10 over the cavity 9.

Figure 9:
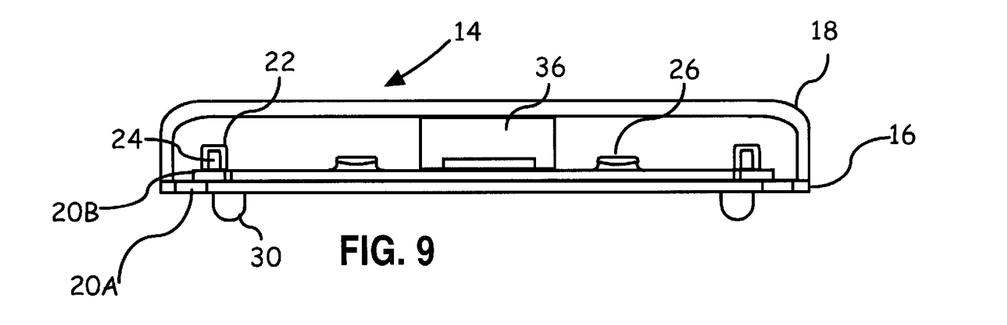
FIG. 9 is an elevational front view showing the various components of the first member in accordance with an exemplary embodiment of the present invention.
Figure 10:
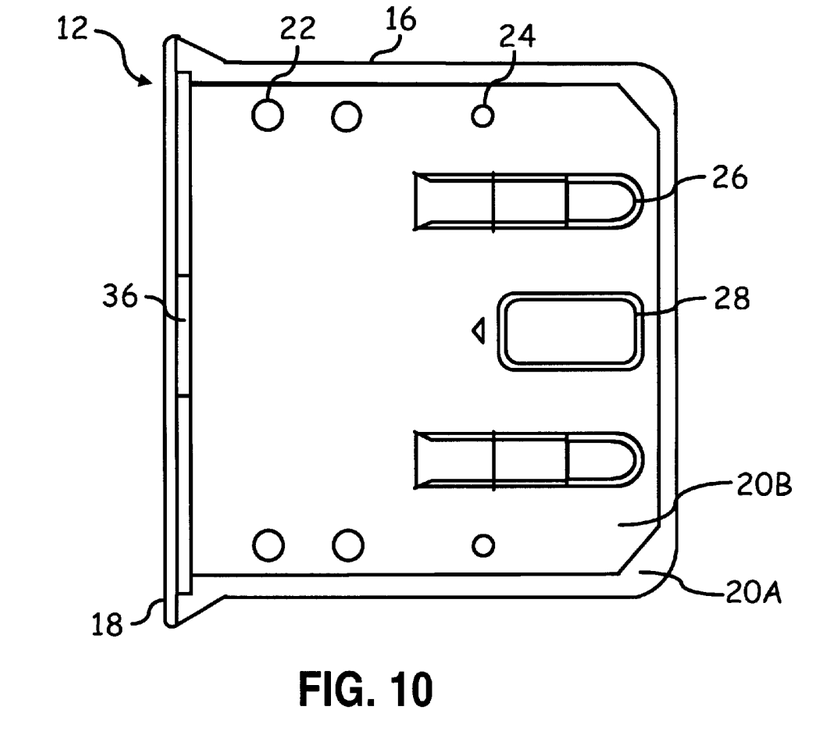
FIG. 10 is a top plan view of the first member in accordance with an exemplary embodiment of the present invention.
Figure 11:
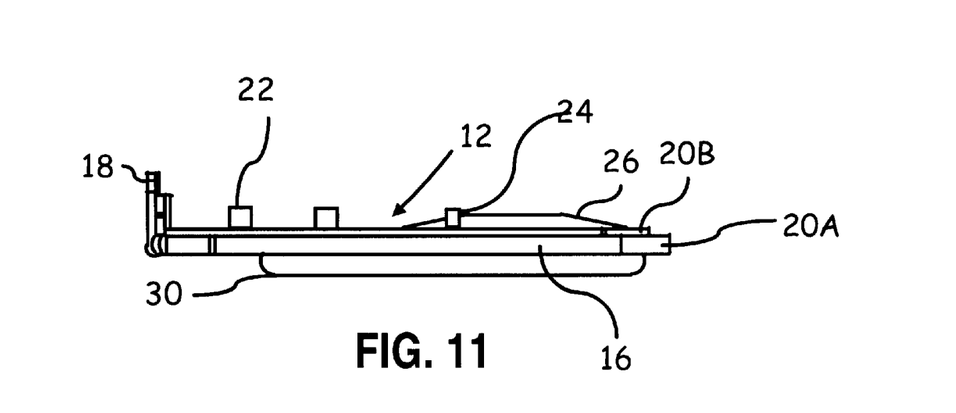
FIG. 11 is a side elevational view of the first member.
Figure 14:
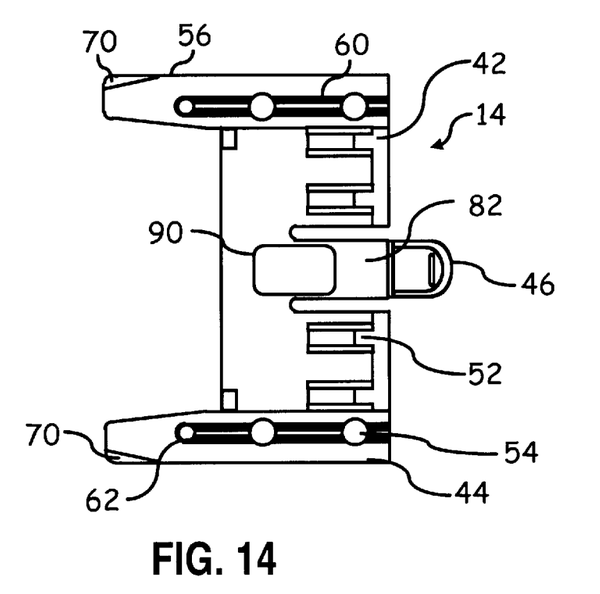
FIGS. 14 and 15 are respective bottom and top plan views of the second member.

Referring now to FIGS. 9–11, although the first member 12 is illustrated as possessing four first mounting pins 22 and two second mounting pins 24 (FIG. 10), the present invention is not limited to this number of mounting pins, but rather may possess any reasonable number of first or second mounting pins, including no mounting pins. Referring further to FIG. 14, the second member 14 is depicted as including first apertures 54 and second apertures 62 corresponding in number to the first and second mounting pins 22, 24. However, the present invention is again not limited to the illustrated number of first and second apertures 54, 62, but rather, the second member 14 of the present invention may possess any reasonable number of first or second apertures, including no apertures.

Referring back now to FIGS. 4 and 5, the first and second apertures 54, 62 possess respective diameters which are only slightly larger than those of the first and second mounting pins 22, 24 such that when mated with one another, a frictional fit is provided therebetween. Additionally, once the first and second mounting pins 22, 24 are mated with the first and second apertures 54, 62, the first member 12 and the second member 14 become aligned with one another, thus facilitating connection thereof.

Figure 6:
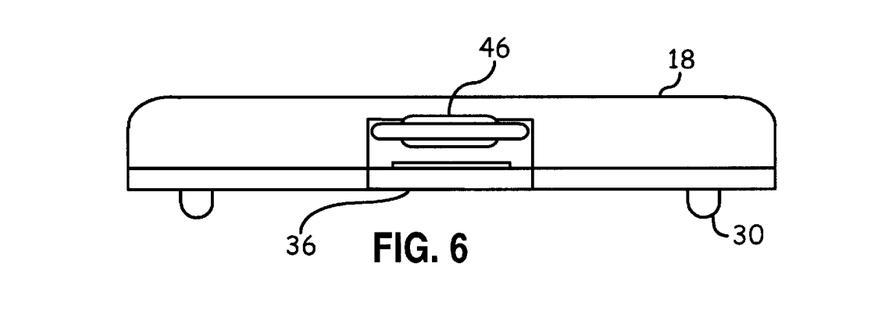
FIG. 6 is a rear view of the drawer assembly of FIG. 4.
Figure 7:
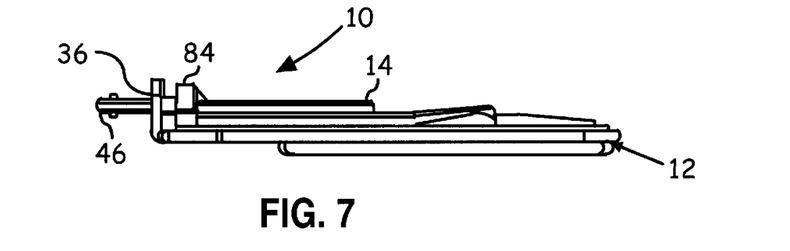
FIG. 7 is a side elevational view of the drawer assembly of FIG. 4.

As illustrated in FIGS. 4, 6, and 7, the first member 12 is equipped with an opening 36 through which a tab member 46 of the second member 14 extends. As most clearly seen in FIG. 6, the opening 36 is configured to allow the tab member 46 to travel vertically from an uppermost position which is substantially horizontal to a lowermost position near the bottom edge of the opening. Accordingly, the width of the opening 36 as only slightly larger than the width of the tab member 46, but the height of the opening as substantially larger than the height of the tab member 46.

Figure 8:
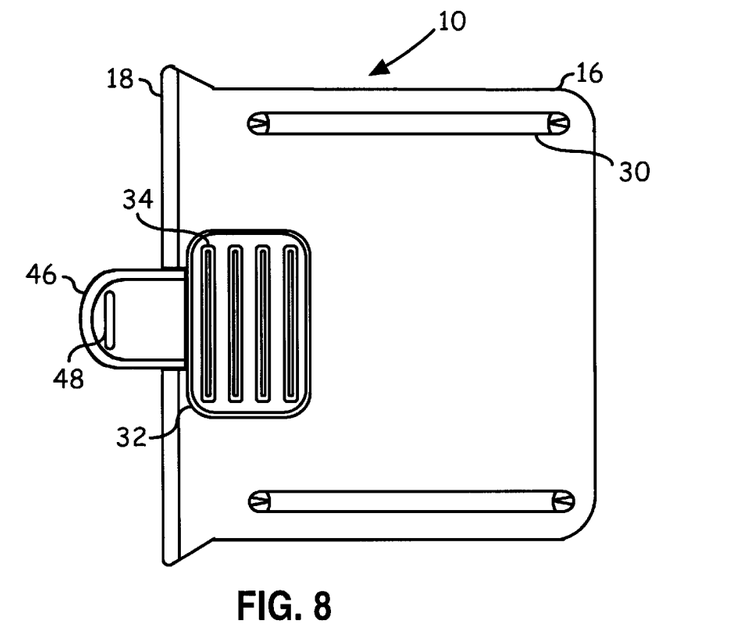
FIG. 8 is a bottom plan view of the drawer assembly of FIG. 4.

FIG. 8 illustrates the bottom of the first member 12 as possessing a gripping surface 32 having a plurality of ridges 34 extending from a bottom surface of the first member. The gripping surface 32 may be formed integrally with the first member 12 or it may be formed separately and attached to the bottom surface thereof by any suitable means. The gripping surface 32 is positioned such that the removal of the drawer from the terminal 1 with the use of only one hand is facilitated. In other words, the gripping surface 32 provides a grooved surface for the user (e.g., merchant) to obtain substantial frictional grip on the drawer assembly 10 while depressing the tab member 46 with his or her thumb. Thus, along with the gripping protrusion 48 of the tab member 46, shown in FIGS. 6–8, the gripping surface 32 provides a surface upon which the user can pull the drawer out of the terminal.

As also illustrated in FIG. 8, the first member 12 includes a pair of support members 30 extending from a bottom surface of the longitudinally extending section 16 in a direction substantially co-extensive therewith. Although a pair of support members 30 are illustrated, the present invention is not limited thereto and may be practiced with any reasonable number of support members. In use, the support members 30 support the drawer assembly 10 on a surface (e.g., a countertop) and facilitate insertion of the drawer assembly into the terminal 1 by assisting in alignment of the female connector section 38 of the drawer assembly to a height corresponding to the height of the tongue-like projection 40 of the terminal 1.

Referring again to FIGS. 9–11, the first member 12 possesses a longitudinally extending section 16 and an upstanding section 18. The upstanding section 18 is positioned substantially perpendicularly to the longitudinally extending section 16 and at an end thereof. The longitudinally extending section 16 possesses a lower surface 20A and an elevated surface 20B having a smaller length and width than the length and width of the lower surface. Thus, a substantially L-shaped surface is formed by the lower surface 20A and the elevated surface 20B. The L-shaped surface, along with the bottom surface of the second member 14 forms the female connector section 38 as illustrated in FIG. 5. The lower surface 20A and the elevated surface 20B may be formed from a unitary sheet of material or may include two separate sheets which are fastened together in any known manner. For example the lower surface 20A and the elevated surface 20B may be secured together by adhesive, ultrasonic welding, or the like.

Also shown in FIGS. 10 and 11 are two protrusions 26 upstanding from the elevated surface 20B of the longitudinally extending section 16. The two protrusions 26 are positioned on the longitudinally extending section 16 generally away from the upstanding section 18. The protrusions 26 are generally tapered along its front and rear surfaces and include a generally flat portion between the tapered sections. The protrusions 26 may be made integrally with the first member 12 (e.g., integrally molded as a single piece) or it may be formed separately and attached thereto in any known suitable manner, e.g., adhesive, ultrasonic welding, or the like. Additionally, the protrusions 26 may be made from any known suitable material including plastic, ABS, or the like.

FIG. 10 additionally shows an icon 28 positioned on the upper surface of the first member 12 illustrating the manner in which the merchant card 8 is to be inserted into the drawer assembly 10.

Figure 12:
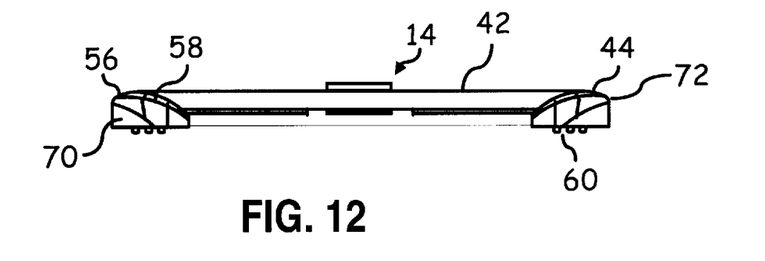
FIG. 12 is an front elevational view showing various components of the second member in accordance with an exemplary embodiment of the present invention.

FIGS. 12–15 show that the second member 14 possesses a substantially planar upper member 42 and a lower member 44. The lower member 44 includes two arms 56 extending generally away from the tab member 46. The arms 56 are connected to and spaced from one another by the upper member 42 and each includes a free end. Each of the arms 56 also includes a plurality of first apertures 54 and a plurality of second apertures 62. The first and second apertures 54, 62 are dimensioned and positioned respectively to correspond and mate with the first and second mounting pins 22, 24 of the first member 12. Along at least a portion of the length of the arms 56, the arms 56 each possesses an inwardly slanted section 58, as seen in FIG. 12. The slanted sections 58 are intended to facilitate insertion of a merchant card 8 between the arms 56. In other words, if a merchant card 8 were to abut against the slanted sections 58, due to the angle of the slanted sections, the merchant card 8 would be urged downward and into a correct position.

Figure 13:
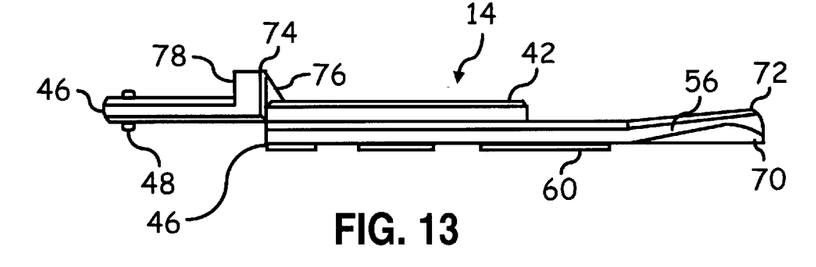
FIG. 13 is a side elevational view of the left side of the second member.

As shown in FIGS. 12–13, at the free end of each of the arms 56 is provided a generally upwardly extending section 72 and a notched portion 70. The notched portion 70 is intended to facilitate insertion of the tongue-like projection 40 into the female connector 38 formed in the drawer assembly 10. That is, the notched portion 70 provides an enlarged opening having a height substantially greater than the height of the tongue-like projection 40 of the terminal 1 to thus make insertion of the tongue-like projection easier.

As also illustrated in FIGS. 12 and 13, a plurality of ribs 60 are provided at a bottom surface of the arms 56. The ribs 60 are intended to provide facilitation of ultrasonic welding of the second member 14 onto the first member 12.

FIG. 14 further illustrates the second member 14 as possessing an ABS pad 90 molded on a bottom surface of the connecting member 82 for providing additional frictional contact with the top surface of the merchant card 8. In a preferred embodiment of the present invention, however, the ABS pad 90 is not required but may be included to provide the additional frictional contact.

Figure 15:
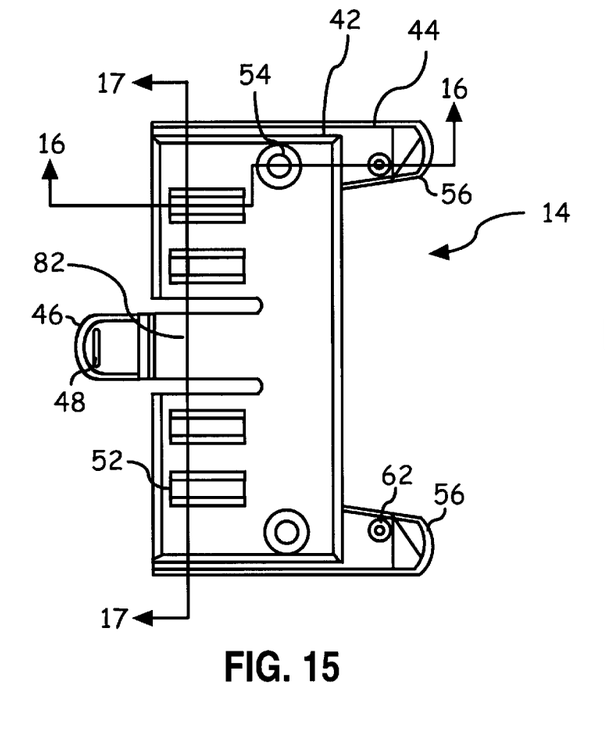

As illustrated in FIGS. 14 and 15, the tab member 46 of the second member 14 is connected to the upper member 42 and is preferably formed integrally therewith; however, the tab member may also be fastened to the upper member 42 by adhesive, welding, or any other known suitable means. In either instance, the tab member 46 is attached to the upper member 42 via a connecting member 82 which is separated from the upper member along its sides by a pair of slits 50. The connecting member 82 is configured to resiliently maintain the tab member 46 in a generally horizontal position. Thus, when the tab member 46 becomes deflected, it is biased to return to the horizontal position.

As depicted in FIG. 13, an abutment structure 74 is formed on the tab member 46 such that the abutment structure extends above an upper surface of the tab member. The abutment structure 74 includes a slanted portion 76 and a substantially upwardly extending flat portion 78. In use, the slanted portion 76 allows for the downwardly extending lip 80 to slide over the abutment structure 74 and the flat portion 78 provides a surface against which the downwardly extending lip 80 may abut. Once the downwardly extending lip 80 has passed completely over the abutment structure 74, the downwardly extending lip 80 become essentially trapped between the flat portion 78 and the upstanding section 18 of the first member 12. As described hereinabove, the tab member 46 additionally possesses a pair of protrusions 48, each respectively positioned on the upper and lower sides of the tab member.

Figure 16:
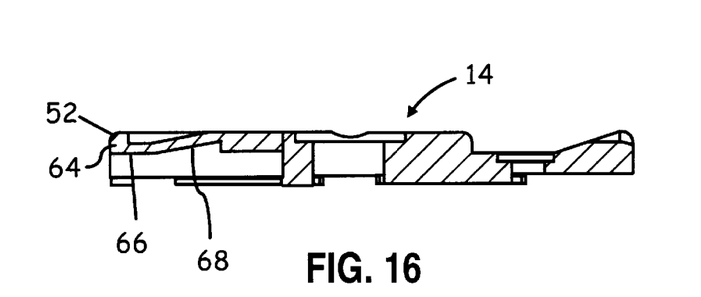
FIG. 16 is a cross-sectional side view taken generally along line "16—16" of FIG. 15 showing details of the second member.
Figure 17:
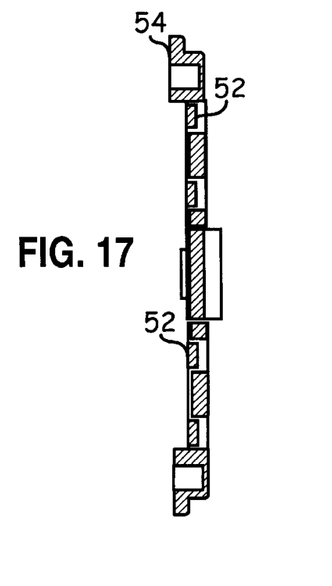
FIG. 17 is a cross-sectional side view taken generally along line "17—17" of FIG. 15 showing further details of the second member.

FIGS. 15–17 show the upper member 42 of the second member 14 as possessing a plurality of downwardly extending tabs 52 positioned and spaced substantially equidistantly in the transverse direction of the upper member. The downwardly extending tabs 52 are composed of a generally vertically extending section 64, a generally horizontally extending section 66, and an angled section 68 (FIG. 16). In use, the angled section 68 provides a surface upon which a merchant card 8 can abut to become positioned within the space 13 between the first and second members 12, 14. Moreover, the generally horizontally extending section 66 is configured to apply a downward force on the top surface of the merchant card 8 when the merchant card is substantially fully inserted within the drawer assembly 10.

Method of Manipulating the Drawer Assembly and Merchant Card

Figure 18:
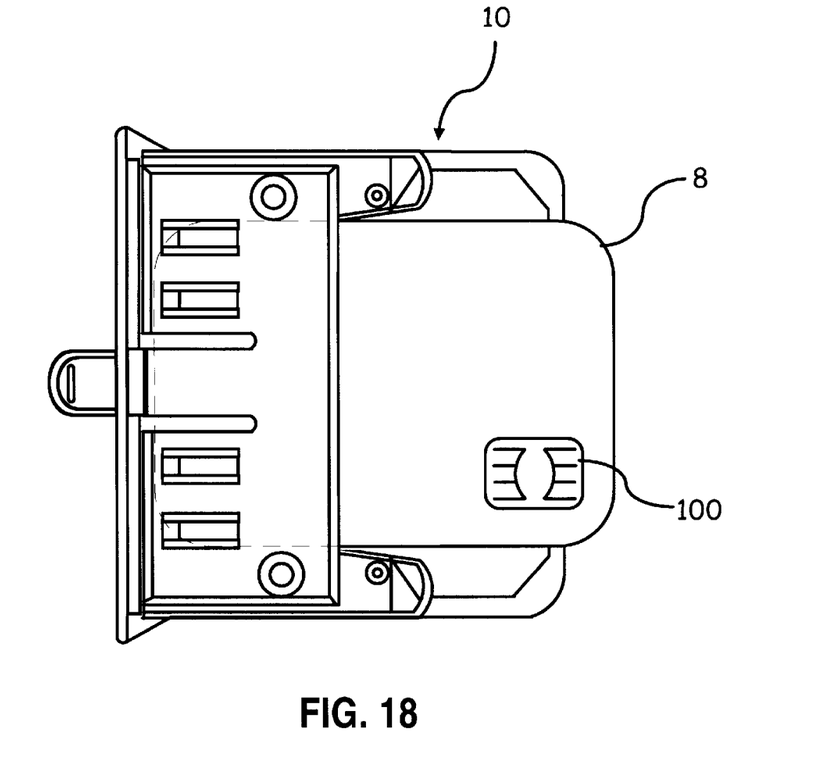
FIG. 18 is a top view of the drawer assembly of the present invention having a merchant card inserted therein.

In order to insert the merchant card 8 into the financial transaction terminal 1, the merchant card is initially inserted into the gap formed between the first and second members 12, 14 of the drawer assembly 10. In this respect, a rear end of the merchant card 8 is positioned substantially over the upstanding protrusions 26 of the first member 12 and guided into the gap by the outwardly projecting arms 56 such that the physical connector 100 thereof extends beyond an outer end of the drawer assembly 10 as shown in FIG. 18. In so doing, the downwardly extending tabs 52 of the second member 14 apply a downward force on the top surface of the merchant card 8 and the upstanding protrusions 26 of the first member 12 apply an upward force on the bottom surface of the merchant card. Thus, the merchant card 8 is maintained in a relatively tight manner within the space 13 of the drawer assembly 10.

The drawer assembly 10 along with the merchant card 8 is then inserted into the cavity 9 of the terminal 1 while the terminal is in an upright position. In so doing, the female connector section 38 of the drawer assembly 10 is lined up with the tongue-like projection 40 provided on the edge of the cavity 9. Once the female connector section 38 and the tongue-like projection are in general alignment, the drawer assembly 10 is inserted into the cavity 9 such that the tongue-like projection 40 is inserted into the female connector section 38 in a substantially tongue-and-groove fashion. According to a preferred embodiment of the present invention, the heights of the first and second mating sections 38, 40 are set at a predetermined value with respect to a common surface. This can be accomplished by varying the height of the support members 30 such that the heights of the first and second mating sections 38, 40 are the same when the drawer assembly 10 and the terminal 1 are placed on a substantially flat surface (e.g., a countertop). Thus, according to this embodiment, simply by orienting the drawer assembly 10 into the correct direction with respect to the cavity 9, the drawer assembly will become automatically aligned with the cavity and thus insertion of the drawer assembly is easily facilitated.

As the drawer assembly 10 travels over the cavity 9, the downwardly extending lip 80 travels over the slanted portion 76 of the abutment structure 74 thereby causing the tab member 46 to become somewhat deflected downwardly. Once the abutment structure 74 has substantially passed the ridge 80, the tab member 46 returns to its original position due to the resilience of the connecting member 82. Thereafter, the downwardly extending ridge 80 becomes substantially seated within the gap 84 formed between the upwardly extending flat portion 78 of the second member 14 and the upstanding section 18 of the first member 12. Thus, the drawer assembly 10 is fully inserted and substantially entirely covers and is also releasably connected to the terminal 1. During this process, the merchant card 8 becomes inserted into the merchant card connector 7. Thus, the merchant card 8 can be properly connected without requiring that the card itself be independently inserted without any outside guidance. Moreover, it is unnecessary to flip the terminal 1 over to insert the merchant card 8 since alignment and insertion of the drawer assembly also causes the alignment and insertion of the merchant card into the merchant card connector 7.

In order to remove the merchant card 9 and the drawer assembly 10 from the terminal 1, the transaction terminal 1 is maintained in an upright position. Initially, the tab member 46 is depressed by applying a downward force on the upper surface of the tab member such that the abutment structure 74 is positioned slightly lower than the downwardly extending lip 80. The drawer assembly 10 is then pulled away from the terminal 1 by simultaneously applying a downward force on the tab member 46 and an upward force on the gripping surface 32. As indicated in the Tables shown hereinbelow, because the amount of force necessary to pull the merchant card 8 out from the merchant card connector 7 is less than that required to pull the merchant card 8 out from the drawer assembly 10, by pulling the drawer assembly out of the terminal 1, the merchant card is also removed therefrom. In this respect, therefore, it is unnecessary to independently remove the merchant card 8 from the terminal 1 after the drawer assembly has been removed. Moreover, it is unnecessary to flip the terminal 1 over to remove the merchant card 8 from the merchant card connector 7.

The information contained in the Tables appearing below will now be discussed in greater detail. At the outset, it is relevant to note that all of the measurements enumerated in the following tables were taken with an IMADA™ force gauge FS-1 model no. 74242 for the measurements in kilograms (Kg) and a SHIMPO™ force gauge MF-50 model no. 40312 for the measurements in pounds (lbs). Separate force gauges were used to measure in pounds and kilograms to improve the accuracy and confidence in the readings.

In addition, in obtaining the force measurements enumerated in the Tables, the tab member 46 was not depressed and thus, no additional force was applied to the merchant card 8 during the force measurements. Accordingly, had the tab member 46 been depressed during the force measurements, a greater difference in the insertion and extraction measurements between the values enumerated in Tables 1 and 2 and Table 3 would have been noted.

Referring now specifically to the Tables appearing hereinbelow, Table 1 sets forth the insertion and extraction forces measured in kilograms in inserting and extracting a merchant card 8 into and out of the merchant card connector 7. The results cited in Table 2 refer to similar force measurements as those recited in Table 1 except that these readings were taken in pounds. Both sets of measurements cited in Tables 1 and 2 were taken at or around room temperature. As can be seen from these Tables, four measurements were taken with each of the force gauges and an average value was determined for each set of readings.

TABLE 1

|  |  | 1 | 2 | 3 | 4 |  |  |
|---|---|---|---|---|---|---|---|
| Insert force | Kg | 0.78 | 0.76 | 0.71 | 0.73 | Average | 0.75 |
| Extract force | Kg | 0.56 | 0.63 | 0.46 | 0.53 | Average | 0.55 |

TABLE 2

|  |  | 1 | 2 | 3 | 4 |  |  |
|---|---|---|---|---|---|---|---|
| Insert force | lbs | 1.5 | 1.25 | 1.5 | 1.2 | Average | 1.36 |
| Extract force | lbs | 1.25 | 1.25 | 1 | 1 | Average | 1.13 |

Figure 19:
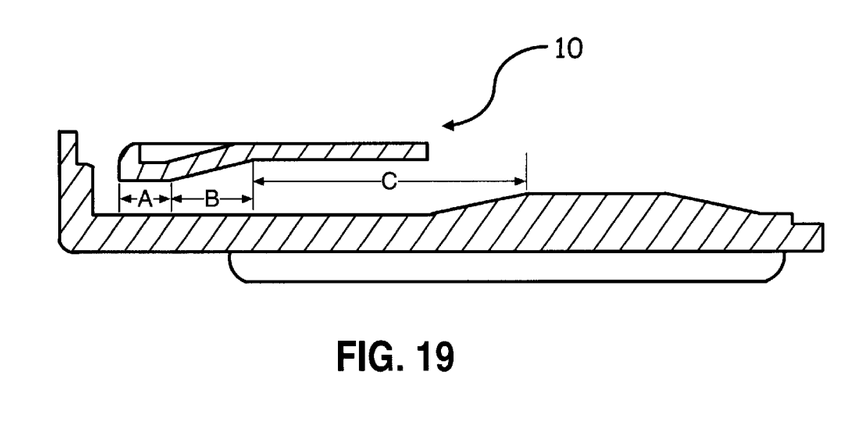
FIG. 19 is a cross-sectional side view of various parts of the drawer assembly illustrating the various positions of the merchant card at which the force measurements enumerated in the Tables appearing below were obtained.

Table 3 enumerates the force measurements obtained in inserting and extracting the merchant card 8 into and out of the drawer assembly 10. All of the measurements were obtained at or around room temperature. Reference is also made to FIG. 19 which illustrates the relative position of the trailing edge of the merchant card 8 with respect to the drawer assembly 10 during the force measurements. Accordingly, the reference designations appearing in the following tables (A, B, and C) correspond to like reference designations appearing in FIG. 19. Additionally, in a similar fashion to the measurements enumerated in Tables 1 and 2, four separate measurements were taken with each of the force measuring devices for measuring both insertion and extraction forces.

TABLE 3

| Prior to | 1 | | 2 | | 3 | | 4 | |
|---|---|---|---|---|---|---|---|---|
| Heat Cycling | lb | Kg | lb | Kg | lb | Kg | Lb | Kg |
| Insertion Forces | | | | | | | | |
| A | 1.25 | 0.75 | 1.25 | 0.71 | 2 | 0.69 | 1.5 | 0.75 |
| B | 1 | 0.52 | 1.25 | 0.52 | 1.25 | 0.56 | 1.75 | 0.6 |
| C | 1.5 | 0.5 | 0.075 | 0.4 | 1.25 | 0.65 | 1 | 0.49 |
| Extraction Forces | | | | | | | | |
| A | 1.5 | 0.7 | 1.5 | 0.71 | 1.25 | 0.67 | 1.5 | 0.625 |
| B | 1 | 0.52 | 1 | 0.49 | 1.25 | 0.52 | 1 | 0.49 |
| C | 1 | 0.47 | 1 | 0.55 | 1 | 0.42 | 1 | 0.52 |

In comparing the results enumerated in Tables 1 and 2 with those cited in Table 3, it is rather apparent that the amount of force necessary to insert and remove the merchant card 8 from the merchant card connector 7 is substantially less than that required to insert and remove the merchant card from the drawer assembly 10. Accordingly, when the drawer assembly 10 is extracted from the terminal 1, the merchant card 8 is also extracted from the merchant card connector 7.

Table 4 illustrates how heat cycling of the drawer assembly 10 and the merchant card 8 affects the amount of force necessary to insert and extract the merchant card 8 into and out of the drawer assembly 10. For these measurements, heat cycling consisted of four (4) cycles, 18° C. to 50° C., over two days with a merchant card 8 installed in the drawer assembly 10. Before and after heat cycling, a total of sixteen (16) force readings were obtained, eight (8) measuring insertion force and eight (8) measuring extraction force. Additionally, reference is made to FIG. 19 which illustrates the relative position of the rear end of the merchant card 8 with respect to the drawer assembly 10 during the force measurements.

TABLE 4

| | 1 | | 2 | | 3 | | 4 | |
|---|---|---|---|---|---|---|---|---|
| After Heat Cycling | lb | Kg | lb | Kg | lb | Kg | lb | Kg |
| Insertion Forces | | | | | | | | |
| A | 1 | 0.45 | 0.9 | 0.52 | 1 | 0.45 | 1 | 0.42 |
| B | 1 | 0.33 | 0.8 | 0.37 | 0.8 | 0.35 | 0.8 | 0.28 |
| C | 0.7 | 0.29 | 1 | 0.32 | 0.6 | 0.23 | 0.8 | 0.26 |
| Extraction Forces | | | | | | | | |
| A | 0.5 | 0.41 | 1 | 0.49 | 1 | 0.37 | 1 | 0.41 |
| B | 0.75 | 0.35 | 0.8 | 0.27 | 0.8 | 0.29 | 0.6 | 0.31 |
| C | 0.5 | 0.26 | 0.5 | 0.25 | 0.6 | 0.31 | 1 | 0.32 |

Although the values obtained in Table 4 are lower than those enumerated in Tables 1 and 2, it is to be noted that the measurements listed in Tables 1 and 2 refer to measurements obtained at or around room temperature. It is however, safe to assume that the measurements appearing in Tables 1 and 2 would have been substantially lower had the merchant card 8 and the merchant card connector 7 been heat cycled in the same manner as was done to the drawer assembly 10 and merchant card for the measurements obtained in Table 4. It is thus recognized that the results enumerated above suggest that the drawer assembly 10 of the present invention will provide sufficient force for reliable merchant card 8 extraction, even after temperature accelerated creep. In order to fully evaluate the effects of plastic strain and low temperature creep, additional parts will need to be available to modify or destroy during testing.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A drawer assembly for covering multi-secure access module connectors and a merchant card connector housed within a cavity of a financial transaction terminal, said drawer assembly comprising:
    a first member and a second member;
    said first member being connected to said second member to thereby form a space therebetween for receiving and holding a merchant card;
    said second member comprising a movable tab member extending from an end thereof;
    said tab member having an upper surface and a lower surface;
    wherein said drawer assembly is capable of securely holding and positioning a merchant card for insertion into and removal from said financial transaction terminal and said drawer assembly is capable of interconnecting with said terminal; and
    wherein when said merchant card is positioned in said drawer assembly, a downward movement of said movable tab causes said drawer assembly to become released from said terminal, such that removal of said drawer assembly causes said merchant card to disengage from said merchant card connector to thereby facilitate removal of said merchant card from said financial transaction terminal.

2. The drawer assembly according to claim 1, wherein said tab member includes a bottom surface, said bottom surface being capable of frictionally engaging an upper surface of said merchant card.

3. The drawer assembly according to claim 1, wherein said tab member further comprises an abutment structure extending from said upper surface of said tab member, said abutment structure including a slanted portion and a substantially flat portion, wherein when said drawer assembly is generally fully inserted within said cavity, said substantially flat portion forms a wall of a groove inside of which a portion of the outer edge of said cavity is inserted, and wherein when said tab member is depressed, said substantially flat portion is adapted to move to a position generally below said outer edge of said cavity, thereby allowing said drawer assembly to be removed from said terminal.

4. The drawer assembly according to claim 1, said first member further comprising a plurality of mounting pins and said second member further comprising a plurality of apertures, wherein said mounting pins are configured to be inserted into said apertures in a mating fashion.

5. The drawer assembly according to claim 1, said first member further comprising at least one upstanding protrusion extending into said space for applying pressure onto a bottom surface of said merchant card.

6. The drawer assembly according to claim 1, said second member further comprising:
    a plurality of tabs extending downwardly into said space for grippingly engaging an upper surface of said merchant card.

7. The drawer assembly according to claim 1, wherein said second member further comprises a pair of arms extending generally in a direction opposite said tab member, said arms forming side walls of said space.

8. A financial transaction terminal for transferring credit information from a customer card to a merchant card, said terminal comprising:
    a housing having an upper side and a bottom side;
    a cavity for allowing access to at least one multi-secure access module connector and a merchant card connector formed in said bottom side of said terminal, said cavity having a generally downwardly extending lip provided at a front part of said cavity;
    a drawer assembly capable of being removably inserted over said cavity to substantially cover said cavity; and
    a merchant card securely and removably held in a space formed in said drawer assembly, wherein said merchant card is inserted into said merchant card connector when said drawer assembly is generally fully inserted into said cavity and wherein said merchant card is removed from said merchant card connector when said drawer assembly is removed from said cavity.

9. The financial transaction terminal according to claim 8, wherein said drawer assembly comprises a movable tab member extending from a rear edge thereof, said tab member including an upper surface and a bottom surface, said bottom surface being capable of frictionally engaging an upper surface of said merchant card.

10. The financial transaction terminal according to claim 9, wherein said tab member further comprises an abutment structure extending from said upper surface of said tab member, said tab member including a slanted portion and a substantially flat portion, wherein when said drawer assembly is generally fully inserted within said cavity, said substantially flat portion forms a wall of a groove inside of which a portion of the outer edge of said cavity is inserted, and wherein when said tab member is depressed, said substantially flat portion is adapted to move to a position generally below said generally downwardly extending lip of said cavity, thereby allowing said drawer assembly to be removed from said terminal.

11. The financial transaction terminal according to claim 9, wherein when said drawer assembly is generally fully inserted into said cavity, said tab member is positioned to be generally hidden when said terminal is viewed from a top side of said terminal.

12. The financial transaction terminal according to claim 8, said drawer assembly comprising a first member and a second member, said first member comprising at least one upstanding protrusion extending into said space, said at least one upstanding protrusion generally applying pressure onto a bottom surface of said merchant card and said second member comprising a plurality of tabs extending downwardly into said space, said tabs generally applying pressure an upper surface of said merchant card.

13. The financial transaction terminal according to claim 8, wherein said merchant card is held within said drawer assembly such that the amount of force required to pull said merchant card from said drawer assembly is substantially greater than the force necessary to pull said merchant card from said merchant card connector.

14. The financial transaction terminal according to claim 8, said drawer assembly further comprising a pair of female connector sections provided on opposite edges thereof and said cavity further comprising a pair of outer edges forming tongue-like projections, wherein said tongue-like projections are inserted within said respective female connector sections when said drawer assembly is inserted into said terminal.

15. The financial transaction terminal according to claim 14, said drawer assembly further comprising at least two support members extending from a bottom surface of the drawer assembly, said at least two support members being configured to substantially align said female connector sections and said tongue-like projections when said terminal and said drawer assembly are placed on a level surface.

16. A method of manipulating a merchant card with respect to a financial transaction terminal, said financial transaction terminal having a merchant card connector positioned in a cavity located in a bottom portion of said terminal, said method comprising the steps of:

provided a drawer assembly having a tab member for substantially covering said cavity;

positioning a rear end of said merchant card into a space defined in said drawer assembly, such that said merchant card is substantially securely maintained within said drawer assembly; and inserting said drawer assembly and said merchant card into said cavity to thereby substantially cover said cavity, wherein said inserting step includes substantially simultaneously inserting said merchant card into said merchant card connector.

17. The method of manipulating a merchant card with respect to a financial transaction terminal according to claim 16, comprising the further step of locking a portion of said drawer assembly with a portion of an outer edge of said cavity.

18. The method of manipulating a merchant card with respect to a financial transaction terminal according to claim 16, comprising the further steps of:

depressing said tab member to thereby cause said portion of said drawer assembly to disengage from said portion of said outer edge to release said drawer assembly from said terminal; and pulling said drawer assembly in a direction generally away from said terminal to thereby remove said drawer assembly from said terminal, wherein said pulling step includes pulling said merchant card from said merchant card connector to thereby remove said drawer assembly and said merchant card from said terminal.

19. The method of manipulating a merchant card with respect to a financial transaction terminal according to claim 16, wherein said depressing step causes a bottom portion of said tab member to apply force upon said merchant card to provide an additionally secure said merchant card within said drawer assembly during said pulling step.

20. The method of manipulating a merchant card with respect to a financial transaction terminal according to claim 16, wherein said terminal is maintained in a generally upright position during the manipulating of said merchant card.

* * * * *